US011661197B2

(12) United States Patent
Lo

(10) Patent No.: US 11,661,197 B2
(45) Date of Patent: May 30, 2023

(54) CABIN OUTFLOW AIR ENERGY OPTIMIZED CABIN PRESSURIZING SYSTEM

(71) Applicant: Honeywell International Inc., Charlotte, NC (US)

(72) Inventor: Charles Lo, Peoria, AZ (US)

(73) Assignee: Honeywell International Inc., Charlotte, NC (US)

( * ) Notice: Subject to any disclaimer, the term of this patent is extended or adjusted under 35 U.S.C. 154(b) by 260 days.

(21) Appl. No.: 16/949,438

(22) Filed: Oct. 29, 2020

(65) Prior Publication Data

US 2021/0039794 A1 Feb. 11, 2021

Related U.S. Application Data

(63) Continuation of application No. 15/824,650, filed on Nov. 28, 2017, now Pat. No. 10,843,804.

(Continued)

(51) Int. Cl.
*B64D 13/02* (2006.01)
*B64D 13/06* (2006.01)

(52) U.S. Cl.
CPC .............. *B64D 13/02* (2013.01); *B64D 13/06* (2013.01); *B64D 2013/0611* (2013.01);
(Continued)

(58) Field of Classification Search
CPC .................... B64D 13/02; B64D 13/04; B64D 2013/0603; B64D 2013/0618;
(Continued)

(56) References Cited

U.S. PATENT DOCUMENTS 2,767,561 A * 10/1956 Seeger ................... B64D 13/06
62/177
2,777,301 A 6/1957 Kuhn
(Continued)

FOREIGN PATENT DOCUMENTS

| EP | 0888966 A2 | 1/1999 |
| EP | 1630099 A2 | 3/2006 |
| EP | 3342709 A1 | 7/2018 |

OTHER PUBLICATIONS

Response to Extended Search Report dated Nov. 23, 2018, from counterpart European Application No. 18185633.7, filed Mar. 15, 2019, 9 pp.

(Continued)

*Primary Examiner* — Ko-Wei Lin
(74) *Attorney, Agent, or Firm* — Shumaker & Sieffert, P.A.

(57) ABSTRACT

A pressurization system includes a first compressor that receives a ram air, a fan air, or engine air; a first turbine that is on a common shaft with the first compressor and wherein the first turbine receives an engine air; a main heat exchanger downstream of the first compressor and the first turbine; an internal environment suitable for human occupants and downstream of the main heat exchanger; a second turbine downstream of the internal environment; the second turbine may be on the common shaft with the first compressor and first turbine; or a generator downstream of the second turbine; a motor downstream of the generator; and wherein the motor drives the first compressor.

18 Claims, 3 Drawing Sheets

Related U.S. Application Data

(60) Provisional application No. 62/539,614, filed on Aug. 1, 2017.

(52) U.S. Cl.
CPC ............... *B64D 2013/0618* (2013.01); *B64D 2013/0644* (2013.01); *B64D 2013/0648* (2013.01); *B64D 2013/0688* (2013.01)

(58) Field of Classification Search
CPC .. B64D 13/00; B64D 13/06; B64D 2013/003; B60H 1/3442
USPC ................ 454/71, 76; 62/DIG. 5; 244/118.5
See application file for complete search history.

(56) References Cited

U.S. PATENT DOCUMENTS

| | | | | |
|---|---|---|---|---|
| 3,740,006 | A * | 6/1973 | Maher | B64D 13/02 244/1 N |
| 4,434,624 | A * | 3/1984 | Cronin | F25B 27/00 62/434 |
| 4,462,561 | A * | 7/1984 | Cronin | B64D 13/06 62/323.3 |
| 4,494,372 | A * | 1/1985 | Cronin | F02C 7/32 60/785 |
| 4,514,976 | A * | 5/1985 | Christoff | F02C 6/06 60/39.15 |
| 4,684,081 | A | 8/1987 | Cronin | |
| 5,201,798 | A * | 4/1993 | Hogan | F02C 7/277 60/39.15 |
| 5,442,905 | A * | 8/1995 | Claeys | B64D 41/00 60/785 |
| 5,461,882 | A * | 10/1995 | Zywiak | B64D 13/06 62/401 |
| 5,899,085 | A * | 5/1999 | Williams | B64D 13/06 62/236 |
| 5,956,960 | A | 9/1999 | Niggeman | |
| 5,967,461 | A * | 10/1999 | Farrington | B64D 13/06 454/115 |
| 6,041,615 | A * | 3/2000 | Ostersetzer | B64D 13/06 62/88 |
| 6,305,156 | B1 * | 10/2001 | Lui | B64D 13/06 60/788 |
| 6,316,841 | B1 * | 11/2001 | Weber | F02C 7/32 62/331 |
| 9,211,954 | B2 * | 12/2015 | Barkowsky | B64D 13/06 |
| 9,254,920 | B2 | 2/2016 | Zhou et al. | |
| 9,302,775 | B2 | 4/2016 | Houssaye | |
| 9,580,180 | B2 * | 2/2017 | Jonqueres | B64D 13/06 |
| 2003/0051500 | A1 * | 3/2003 | Asfia | B64D 13/06 62/402 |
| 2004/0194493 | A1 * | 10/2004 | Army, Jr. | F28D 9/0093 62/402 |
| 2006/0231680 | A1 * | 10/2006 | Derouineau | B64D 13/02 244/118.5 |
| 2007/0266695 | A1 * | 11/2007 | Lui | B64D 13/06 60/204 |
| 2010/0323601 | A1 * | 12/2010 | Cremers | B64D 13/06 454/76 |
| 2013/0133348 | A1 * | 5/2013 | Squier | B64D 13/02 62/402 |
| 2016/0376021 | A1 * | 12/2016 | Ullyott | F01C 21/008 60/783 |
| 2017/0190429 | A1 * | 7/2017 | Casado Montero | B64D 13/06 |
| 2017/0241340 | A1 * | 8/2017 | Feulner | F02C 7/185 |
| 2019/0039738 | A1 | 2/2019 | Lo | |

OTHER PUBLICATIONS

Notice of Intent to Grant and Text Intended to Grant from counterpart European Application No. 18185633.7, dated Oct. 17, 2019, 19 pp.

Decision to Grant dated Feb. 6, 2020, from counterpart European Application No. 18185633.7, 2 pp.

Extended Search Report from counterpart European Application No. 20160118.4, dated Jul. 21, 2020, 10 pp.

Extended Search Report from counterpart European Application No. 18185633.7, dated Nov. 23, 2018, 10 pp.

Prosecution History from U.S. Appl. No. 15/824,650, dated Nov. 26, 2019 through Aug. 27, 2020, 60 pp.

Notice of Intent to Grant and Text Intended to Grant from counterpart European Application No. 20160118.4 dated May 17, 2022, 21 pp.

Response to Extended Search Report dated Jul. 21, 2020, from counterpart European Application No. 20160118.4, filed Feb. 12, 2021, 15 pp.

* cited by examiner

CABIN OUTFLOW AIR ENERGY OPTIMIZED CABIN PRESSURIZING SYSTEM

This application is a continuation of U.S. patent application Ser. No. 15/824,650, filed Nov. 28, 2017, which claims the benefit of U.S. Provisional Patent Application No. 62/539,614, filed Aug. 1, 2017, the entire content of each of which is incorporated herein by reference.

BACKGROUND OF THE INVENTION

The present invention generally relates to environmental control systems and, more particularly, to apparatus and methods for pressurizing an occupant environment of a vehicle.

In aircraft, traditional pneumatic systems use main engine bleed air to pressurize and condition the cabin. This approach can be compact and elegant.

However, the cabin pressurization function consumes the largest amount of power at altitude even when the bleed condition (pressure) matches the environmental control system (ECS) demand. The energy used to generate bleed air is only partially used, and a good portion of the energy is wasted due to the mismatch between the main engine (ME) operating conditions and cabin pressurization and air conditioning needs through various flight segments.

Recent movement towards More Electric Aircraft (MEA) uses cabin air compressors to pressurize ambient air to match the cabin pressure and air conditioning so little energy is wasted, but the cabin air compressor (CAC) is less efficient than the main engine compressor, and the operation is not at peak efficiency.

Also, the electrically driven CAC involves heavy motors and power electronics, demand for high electric power generation from ME and APU generators, and insatiable cooling requirement for its continuous safe operation. Failure mode conditions and redundancy requirements make the system even more complex and heavy.

As can be seen, there is a need for improved apparatus and methods to reduce power consumption for pressurizing the vehicle.

SUMMARY OF THE INVENTION

In one aspect of the present invention, a pressurization system comprises a first compressor that receives a ram air, a fan air, and a bleed air; a first turbine that is on a common shaft with the first compressor and wherein the first turbine receives the bleed air; a main heat exchanger (hot side) downstream of the first compressor and the first turbine; an internal environment suitable for human occupants downstream of the main heat exchanger (hot side); a second turbine that is on a common shaft with the first compressor and first turbine downstream of the internal environment; and the main heat exchanger (cold side) is downstream of the second turbine.

In another aspect of the present invention, a pressurization system comprises a first compressor that receives a ram air, a fan air, and a bleed air; a first turbine that is on a common shaft with the first compressor and wherein the first turbine receives the bleed air; a main heat exchanger (hot side) downstream of the first compressor and the first turbine; an internal environment suitable for human occupants downstream of the main heat exchanger (hot side); a second turbine downstream of the internal environment; the main heat exchanger (cold side) is downstream of the second turbine; a generator that is on a common shaft with the second turbine; and a motor, that is on the common electric circuit, is on the common shaft with the first compressor and the first turbine.

These and other features, aspects and advantages of the present invention will become better understood with reference to the following drawings, description and claims.

DETAILED DESCRIPTION OF THE INVENTION

Figure 1:
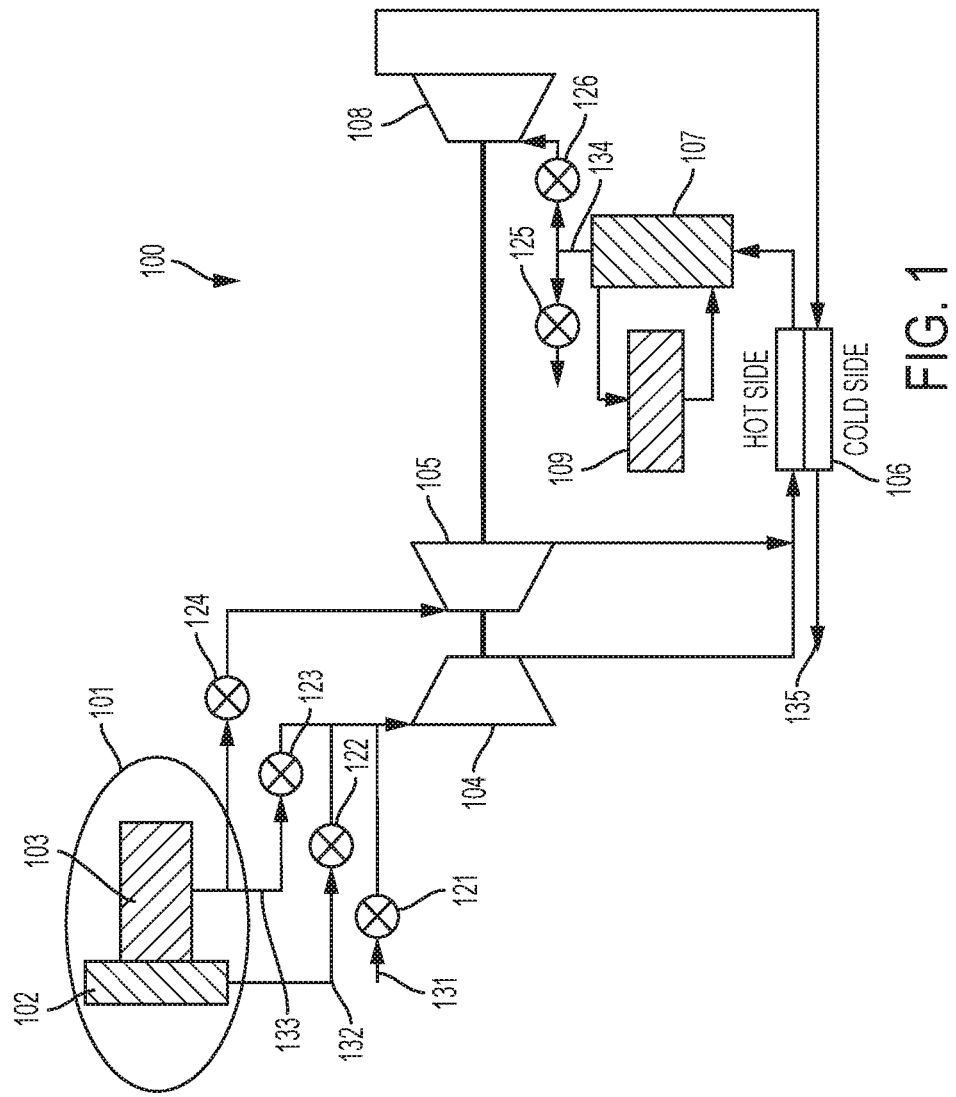
FIG. 1 is a schematic diagram of a pressurization system according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides a pressurization system that can use, in the context of an aircraft for example, engine fan air boosted by a boost compressor, which is powered by a cabin outflow air turbine (COT), and then cooled by the COT exhaust. This invention can provide cabin pressurization without additional power draw from the aircraft, or ram air (drag) for cooling, resulting in ~2% mission fuel burn savings.

The fan air of the present invention can take only about ⅕ to ⅓ of the power needed in comparison to when engine bleed air is used. And since the pressure boosted fan air may stay well below 400° F., a pre-cooler, which would be used with engine bleed air, is not needed.

Above altitude (e.g., 12,000 feet) where the fan air pressure is too low for cabin pressurization, the energy already "stored" in the cabin can be reclaimed for both mechanical power to boost the fresh fan air, and the COT exhaust air provides a heat sink to chill the boosted fan air as cabin fresh air intake. The power recovered from an outflow air stream follows the inverse profile of that needed for cabin pressurization.

Since the fresh air cooled by subfreezing expanded cabin air is cool enough to provide air conditioning function during cruise, ram air for the environmental control system (ECS) cooling of the interior environment will not be needed, and the eliminated ram drag about offsets the lost thrust recovery from an outflow valve. Thus, this invention can provide cabin pressurization without additional power draw from the aircraft, or ram air (drag) for cooling, resulting in ~2% mission fuel burn savings.

The complete cabin pressurization cycle is powered by the dynamic head of the free stream air (ram air) plus the elevated total pressure by the engine fan, which are sufficient to offset the invention system losses (compressor/turbine efficiencies, ducting, and leakage).

Fresh air temperature entering the cabin is able to be maintained due to the temperature difference between the extremely cold ambient air and cabin air that offsets the thermal cycle efficiency losses (compressor/turbine efficiencies, heat exchanger).

Cabin air conditioning can be achieved by a vapor cycle subsystem with a consistently higher coefficient of performance on the ground and in low altitude flight, independent of cabin pressurization.

Although the present invention is described below in the context of an aircraft, the present invention is not so limited and may be implemented in other vehicles.

Herein, the term "direct" or "directly" is intended to mean that two components of the system are immediately upstream or downstream with one another and without a third component therebetween other than ducting or wiring between the two components.

FIG. 1 is a schematic diagram of an exemplary embodiment of a pressurization system 100 according to the present invention. The system 100 may include an engine compressor 103 that may produce a high pressure engine air 133. In embodiments, an engine 101 may be a main engine and/or an auxiliary power unit (APU). If the system 100 is implemented in an aircraft, the engine air 133 may be an engine bleed air, such as from a compressor(s) of the main engine.

The system 100 may also include a fan 102, such as when the system 100 is implemented for an aircraft. The fan 102 may use an outside (ambient) air to produce a fan air 132. As contemplated by the present invention. The fan air 132 is from outside air boosted by the fan 102.

From the fan 102, the fan air 132 may flow to a downstream boost compressor (BC) 104. On a common shaft with the boost compressor 104 may be a boost turbine (BT) 105. The boost compressor 104 can be driven by either the boost turbine 105 or a cabin outflow turbine 108. Accordingly, while the boost compressor 104 receives the fan air 132, the boost compressor 104 may optionally receive, via an idling valve 123, the engine air 133. The boost turbine 105 may receive, via a bleed air valve 124, the engine air 133.

Air from the boost compressor 104 and/or the boost turbine 105 may flow to the hot side of a directly downstream main heat exchanger (MHEX) 106. From the hot side of the heat exchanger 106, pressurized or conditioned air may flow to a directly downstream interior occupant environment 107, such as a cabin of an aircraft.

A cabin outflow air 134 may exit the environment 107 and, via a valve 125, go overboard. Alternatively, or in addition, the cabin outflow air 134 may flow to a downstream outflow turbine 108, such as a cabin outflow turbine (COT), via a variable geometry nozzle 126. The outflow turbine 108 may drive the boost compressor 104 that is on the common shaft.

Also from the outflow turbine 108, the cabin outflow air 134 may flow into the downstream cold side of the main heat exchanger 106, and then discharged overboard, as shown by reference number 135 in FIG. 1.

In embodiments, a ram air (i.e., outside air) 131 can feed into the boost compressor 104 via a ram air valve 121. In this arrangement, either the ram air 131 or the fan air 132 can flow into the boost compressor 104, depending on the condition and section of the flight. For example, in hot days and low altitude (say less than 8,000 feet), ram air is selected; whereas in a cold day and low altitude, the warmer fan air is selected.

The provision of the ram air 131, the fan air 132, the engine air 133, the ram air valve 121, a fan air valve 122, and the idling valve 123 provides for flexibility and matching of the conditioned air needs of the environment 107, the phase of operation of the vehicle (e.g., aircraft), and energy savings. At a given phase of vehicle operation, one or more of the ram air 131, the fan air 132, and the engine air 133, can be employed to pressurize the system 100.

For example, in one phase of vehicle operation (e.g., when an aircraft is from sea level up to 8,000 feet in altitude), the system 100 may only employ the ram air 131 as the sole source of fresh air to pressurize the environment 107. In a further phase of vehicle operation (e.g., when the aircraft is between 8,000 feet and cruise altitude), the system 100 may employ the fan air 132 as the fresh air source to pressurize the environment 107. In another phase of vehicle operation (e.g., when the engine is idling as the aircraft is descending), the system 100 may only employ the engine air 133 which may be main engine air and/or APU bleed air. And in situations when the power from the cabin outflow turbine 108 is insufficient to drive the pressurization of the cabin 107, the engine air 133 may be employed to drive the boost turbine 105 to supplement the power needed.

During the low altitude phase of operation, when neither the cabin outflow turbine 108 nor the boost compressor 104 are needed, the cabin outflow valve 125 is modulating to maintain the appropriate cabin 107 pressure. As the altitude increases, power is needed from the cabin outflow turbine 108 to drive the boost compressor 104. The balancing of the power between the pair is accomplished by modulating the variable geometry nozzle 126 of the cabin outflow turbine 108, and the cabin outflow valve 125 will be modulating down to complete shut off.

Figure 2:
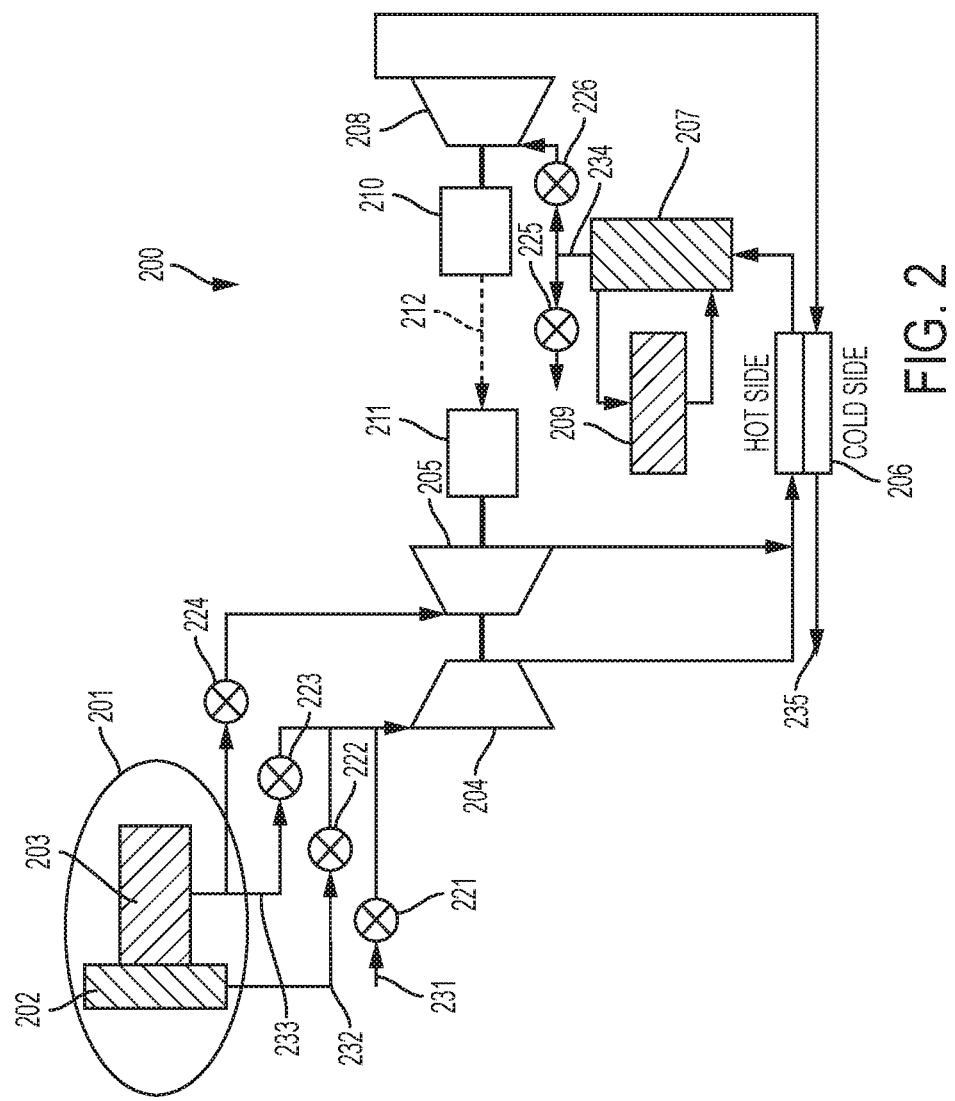
FIG. 2 is a schematic diagram of a pressurization system according to a further embodiment of the present invention.

FIG. 2 is a schematic diagram of another exemplary embodiment of a pressurization system 200 according to the present invention. The system 200 is similar to the system 100 of FIG. 1. In the latter, the boost compressor 104, boost turbine 105, and outflow turbine 108 are connected by a common shaft. In most cases, however, it is not practical or possible to connect these components with high rotational speed on a common shaft. Accordingly, the system 200 may include other components similar in design and function to the components of the system 100.

In embodiments, the system 200 may include all components included in system 100. For example, an engine 201 may be an example of engine 101, a fan 202 may be an example of fan 102, an engine compressor 203 may be an example of engine compressor 103, a boost compressor 204 may be an example of boost compressor 104, a boost turbine 205 may be an example of boost turbine 105, heat exchanger 206 may be an example of heat exchanger 106, an occupant environment 207 may be an example of occupant environment 107, a cabin outflow turbine 208 may be an example of cabin outflow turbine 108, a ram air valve 221 may be an example of ram air valve 121, a fan air valve 222 may be an example of fan air valve 122, an idling valve 223 may be an example of idling valve 123, a bleed air valve 224 may be an example of bleed air valve 124, a cabin outflow valve 225 may be an example of cabin outflow valve 125, a variable geometry nozzle 226 may be an example of variable geometry nozzle 126, ram air 231 may be an example of ram air 131, fan air 232 may be an example fan air 132, and cabin outflow air 234 may be an example of cabin outflow air 134. In addition, system 200 may further include an electric motor (synchronous) (SM) 211 that is on common shaft with the boost compressor 204, an electric generator (permanent magnet) 210 that is on common shaft with the cabin outflow turbine 208, and a private electric bus 212 connecting the motor 211 and generator 210. And the cabin outflow turbine 208 is not on the common shaft with the boost compressor 204 and boost turbine 205. Similar to the description of FIG. 1, from the outflow turbine 208, the cabin outflow air 234 may flow into the downstream cold side of the heat exchanger 206, and then discharged overboard, as shown by reference number 235 in FIG. 2.

The electric generator 210, which can be a permanent magnet or otherwise, is driven by the cabin outflow turbine 208. The electrical power generated by the generator is transmitted, via the private bus 212, directly to the motor 211, which can be a synchronous, induction, or a combination of both, which in turn drives the boost compressor 204.

Since the cabin outflow turbine 208 and boost compressor 204 run at a constant speed ratio, when connecting the pair with the private bus 212, the need for motor and generator controllers are eliminated.

In an embodiment with a synchronous motor, the synchronization of the motor to the generator may be achieved by flowing engine air 233 into the boost turbine 205 to match its shaft speed to the private bus 212 frequency.

Figure 3:
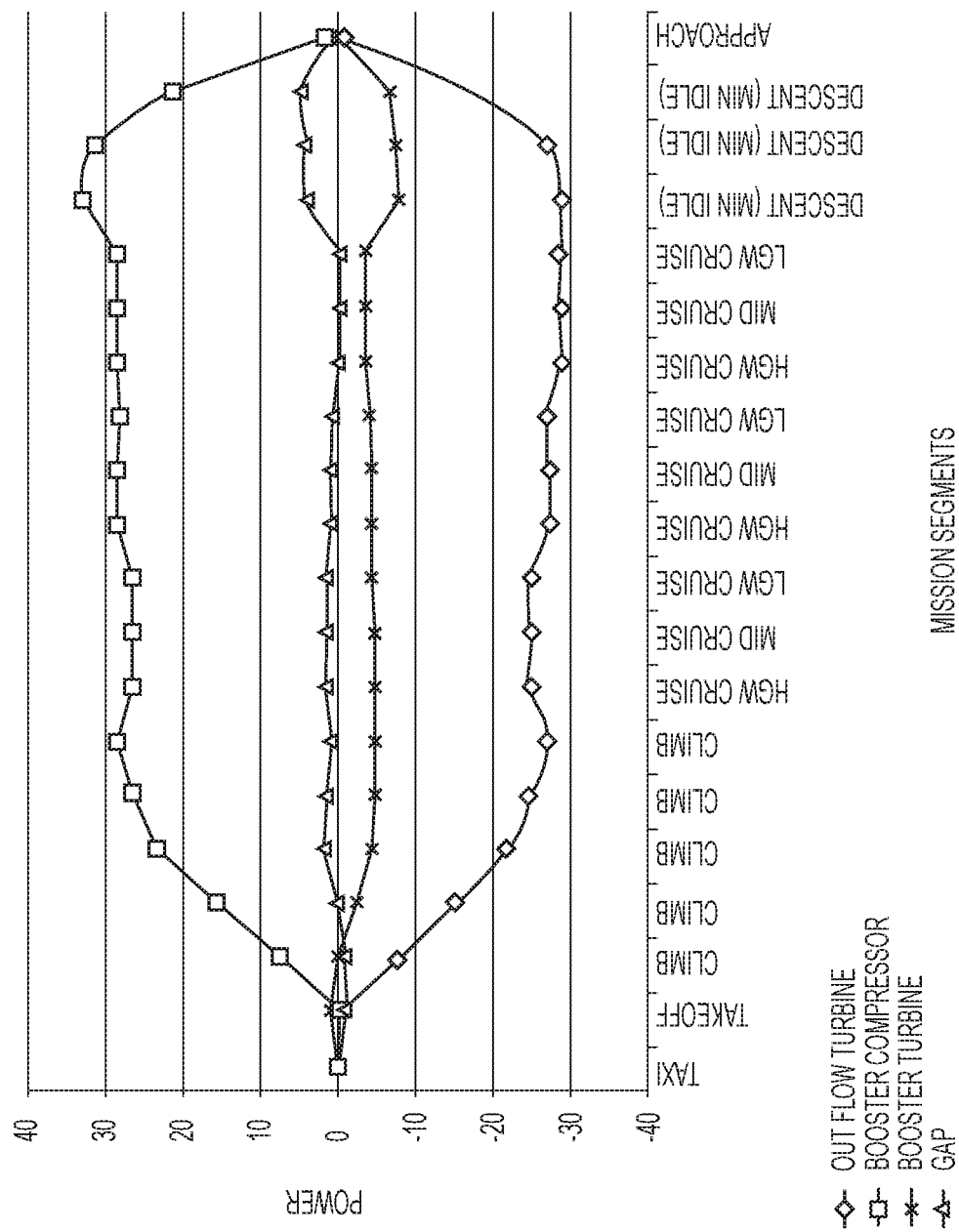
FIG. 3 is a graph of system power versus vehicle operating condition according to an embodiment of the present invention.

FIG. 3 is a graph of system power versus vehicle operating condition according to an exemplary embodiment of the present invention. In the context of an aircraft, the operating conditions may range from airport taxi out to airport approach and land.

In FIG. 3, a first line having diamond-shaped symbols thereon represents power recovered from the outflow turbine 108. In FIG. 3, a second line having square-shaped symbols thereon represents the power required for cabin pressurization. In FIG. 3, a third line having triangle-shaped symbols thereon represents the gap or difference between the power recovered (the first line) and the power required (the second line). The gap or deficiency can be "filled" by the booster turbine 105, as represented by, with reference to FIG. 3, a fourth line having x-shaped symbols thereon.

As can be appreciated, the present invention eliminates the need of ram air for traditional bleed air cooling (pre-cooler, primary, secondary), and otherwise remove the ram drag that can offset the thrust recovered by cabin outflow valves. This no bleed system also means that the APU can be all electric, which can then be operated on the ground, during takeoff and climb, and during descent, to maximize APU run time. This architecture also relieves the main engine of maintaining rotor speed for generators (frequency) and bleed pressure for the ECS, which allows the main engines to pull the throttle back further during descent, and save fuel during that half hour of the flight.

It should be understood, of course, that the foregoing relates to exemplary embodiments of the invention and that modifications may be made without departing from the spirit and scope of the invention as set forth in the following claims.

What is claimed is:

1. A pressurization system configured to provide pressurized air to an internal environment suitable for occupants, the system comprising:
    a heat exchanger comprising a hot side upstream of the internal environment;
    a compressor upstream of the hot side of the heat exchanger;
    a first turbine on a common shaft with the compressor, wherein the first turbine is downstream of an engine compressor;
    an idling valve upstream of the compressor, wherein the idling valve is configured to deliver the engine air from the engine compressor to the compressor; and
    a second turbine configured to receive air from the internal environment, wherein the second turbine is configured to drive the compressor.

2. The system of claim 1, further comprising a fan air valve upstream of the compressor.

3. The system of claim 1, further comprising a bleed air valve upstream of the first turbine.

4. The system of claim 1, wherein the second turbine is on the common shaft and wherein the second turbine is configured to drive the compressor directly via the common shaft.

5. The system of claim 1, wherein the common shaft is a first common shaft, the system further comprising a generator on a second common shaft with the second turbine.

6. The system of claim 1, further comprising an electric motor on the common shaft with the compressor.

7. The system of claim 1, further comprising a variable geometry nozzle configured to allow air to flow to the second turbine from the internal environment.

8. The system of claim 1, wherein a cold side of the heat exchanger is downstream of the second turbine.

9. The system of claim 1, wherein the second turbine is downstream of the hot side of the heat exchanger.

10. The system of claim 1, further comprising a cabin outflow valve downstream of the internal environment, wherein outflow air exits the internal environment and, via the cabin outflow valve, flows overboard.

11. A pressurization system configured to provide pressurized air to an internal environment suitable for occupants, the system comprising:
    a heat exchanger comprising a hot side upstream of the internal environment;
    a boost compressor upstream of the hot side of the heat exchanger;
    a fan air valve upstream of the boost compressor, wherein the fan air valve is configured to deliver fan air from a fan of an engine to the boost compressor;
    a first turbine on a common shaft with the boost compressor, wherein the first turbine is downstream of an engine compressor of the engine;
    a bleed air valve upstream of the first turbine, wherein the bleed air valve is configured to deliver engine air from the engine compressor to the first turbine;
    an idling valve upstream of the boost compressor, wherein the idling valve is configured to deliver the engine air from the engine compressor to the boost compressor; and
    a second turbine configured to receive air from the internal environment, wherein the second turbine is configured to drive the boost compressor.

12. The system of claim 11, further comprising a ram air valve upstream of the boost compressor, wherein the ram air valve is configured to deliver outside air to the boost compressor.

13. The system of claim 11, wherein the common shaft is a first common shaft, the system further comprising:
    a generator on a second common shaft with the second turbine, wherein the generator is configured to generate electrical power;
    an electric motor on the first common shaft with the first turbine and the boost compressor; and
    a private bus configured to transmit the electrical power from the generator to the motor.

14. A pressurization system configured to provide pressurized air to an internal environment suitable for occupants, the system comprising:
- a heat exchanger comprising a hot side upstream of the internal environment;
- a compressor upstream of the hot side of the heat exchanger;
- a first turbine on a common shaft with the compressor, wherein the first turbine is downstream of an engine compressor;
- an idling valve upstream of the compressor, wherein the idling valve is configured to deliver the engine air from the engine compressor to the compressor; and
- a second turbine configured to receive air from the internal environment,
- wherein the second turbine is configured to drive the compressor,
- wherein a cold side of the heat exchanger is downstream of the second turbine, and
- wherein the second turbine is downstream of the hot side of the heat exchanger.

15. The system of claim 14, further comprising a variable geometry nozzle configured to allow air to flow to the second turbine from the internal environment.

16. The system of claim 14, further comprising a cabin outflow valve downstream of the internal environment, wherein outflow air exits the internal environment and, via the cabin outflow valve, flows overboard.

17. The system of claim 14, wherein the first turbine and the compressor are configured to receive engine air from an auxiliary power unit.

18. The system of claim 14, wherein the common shaft is a first common shaft, the system further comprising:
- a generator on a second common shaft with the second turbine, wherein the generator is configured to generate electrical power;
- an electric motor on the first common shaft with the first turbine and the compressor; and
- a private bus configured to transmit the electrical power from the generator to the motor.

* * * * *